United States Patent
Sanderson et al.

(10) Patent No.: US 9,269,979 B2
(45) Date of Patent: Feb. 23, 2016

(54) CENTRIFUGAL WATER SEPARATOR FOR A FUEL CELL SYSTEM

(71) Applicant: Ford Global Technologies, LLC, Dearborn, MI (US)

(72) Inventors: William F. Sanderson, Commerce Township, MI (US); Steven Potvin, Harper Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 262 days.

(21) Appl. No.: 13/795,023

(22) Filed: Mar. 12, 2013

(65) Prior Publication Data

US 2014/0272631 A1    Sep. 18, 2014

(51) Int. Cl.
*H01M 8/02* (2006.01)
*H01M 8/04* (2006.01)
*H01M 8/06* (2006.01)

(52) U.S. Cl.
CPC ........ *H01M 8/0687* (2013.01); *H01M 8/04097* (2013.01); *H01M 8/04164* (2013.01); *Y02E 60/50* (2013.01)

(58) Field of Classification Search
CPC . H01M 8/04; H01M 8/0487; H01M 8/04156; H01M 8/04164; H01M 8/04097
See application file for complete search history.

(56) References Cited

U.S. PATENT DOCUMENTS

| | | | |
|---|---|---|---|
| 2,222,930 A | 11/1940 | Arnold | |
| 3,426,513 A | 2/1969 | Bauer | |
| 4,015,960 A | 4/1977 | Nutter | |
| 5,643,470 A * | 7/1997 | Amini | 210/787 |
| 6,579,637 B1 * | 6/2003 | Savage et al. | 429/414 |
| 6,776,823 B2 | 8/2004 | Hotta et al. | |
| 6,869,469 B2 | 3/2005 | Grover et al. | |
| 7,618,471 B2 | 11/2009 | Brown et al. | |
| 2001/0005986 A1 * | 7/2001 | Matsubara et al. | 55/459.1 |
| 2004/0197622 A1 * | 10/2004 | Wheat et al. | 429/22 |
| 2005/0199546 A1 | 9/2005 | Rusta-Sallehy et al. | |
| 2006/0240299 A1 * | 10/2006 | Kanasugi | 429/24 |
| 2010/0092818 A1 * | 4/2010 | Lee et al. | 429/21 |

* cited by examiner

*Primary Examiner* — Kenneth Douyette
(74) *Attorney, Agent, or Firm* — Damian Porcari; Brooks Kushman P.C.

(57) ABSTRACT

A separator for a fuel cell includes first and second ends connected by a side wall to define a separation chamber. The first end has a protrusion extending into the chamber to form a channel with the wall. An inlet conduit is tangentially connected to the wall. An outlet conduit connected to the wall between the inlet conduit and the first end. A liquid drain is connected to the second end. A fuel cell system includes a fuel cell stack and a separator. The separator has first and second portions forming a chamber and a divider. The first portion has a continuous inner wall, an end wall forming a central convex projection, an inlet conduit and an outlet conduit. The second portion has a continuous inner wall, an end wall, and a liquid drain.

19 Claims, 3 Drawing Sheets

CENTRIFUGAL WATER SEPARATOR FOR A FUEL CELL SYSTEM

TECHNICAL FIELD

Various embodiments relate to a device for removing water from a fuel cell system.

BACKGROUND

During fuel cell operation, byproducts such as product water and nitrogen, and unconsumed hydrogen may form at the anode side of a fuel cell stack. In certain known systems, accumulation of product water and nitrogen accumulation is controlled in an attempt to avoid a reduction in fuel cell performance, and/or fuel cell system shut down. One known approach is to release the water and nitrogen via a passageway downstream of the fuel cell stack. The byproducts may be recirculated such that the unconsumed hydrogen is returned to the anode side of the fuel cell stack. Also, recirculation may be used to humidify the anode side to promote efficient chemical conversion and extend cell membrane life. However, liquid water in the recirculation stream, such as droplets, may need to be removed to prevent water blockages within fuel cell stack flow field channels or an ejector.

Traditional water separators have flow paths, screens and/or meshes that entrain water droplets in flow impact for water removal. These devices may have high water removal efficiencies, i.e., up to 99%. However, the design of these conventional devices causes a relatively large pressure drop across the system for a given volume of the device.

For an ejector based fuel cell with a passive recirculation loop, minimizing the pressure drop through an anode loop of a fuel cell system may be critical. Ejectors are momentum transfer devices, and as such, the passive recirculation flow they induce is a function of compression work performed by the ejector. Any pressure drops within the anode loop increase the compression work for the ejector, and may limit the recirculation flow. The dominant pressure drop in the anode loop is caused by the fuel cell stack, and pressure drops across other components, such as a water separator, need to be minimized for the ejector and fuel cell to function properly. Additionally, the high efficiency of conventional separators may result in too low of humidity and degrade fuel cell performance and life as some humidity is desirable in the recirculation flow.

SUMMARY

According to an embodiment, a fuel cell system has a fuel cell stack and a separator in fluid communication with the fuel cell stack. The separator has a separation chamber defined by first and second ends connected by a side wall, the first end having a protrusion extending into the chamber to form a channel with the wall. An inlet conduit is tangentially connected to the wall. An outlet conduit is connected to the wall between the inlet conduit and the first end. A liquid drain is connected to the second end.

According to another embodiment, a separator for a fuel cell has a separation chamber defined by first and second ends connected by a generally cylindrical side wall, the first end having a protrusion extending into the chamber to form a channel with the wall. An inlet conduit is tangentially connected to the wall. An outlet conduit is connected to the wall between the inlet conduit and the first end. A liquid drain is connected to the second end.

According to yet another embodiment, a fuel cell system has a fuel cell stack and a separator in fluid communication with the fuel cell stack. The separator has a first portion and a second portion forming a chamber, and a divider. The divider has a screen with an edge gasket. The edge gasket is interposed between the first and second portions such that the screen extends across the chamber. The first portion has a continuous inner wall and an end wall forming a central convex projection shaped to extend into the chamber to form a channel with the inner wall. The first portion also has an inlet conduit and an outlet conduit interposed between the inlet conduit and the end wall. The second portion has a continuous inner wall, an end wall, and a liquid drain connected to the end wall.

Various embodiments of the present disclosure have associated non-limiting advantages. For example, providing a separator with a low pressure drop allows for use with a passive recirculation loop in an anode side of a fuel cell. The low pressure drop is created within the separator by providing a smooth tangential fluid entry into the separator, and not using additional mesh material in the gas phase fluid flow path within the separator. The separator is designed to remove larger water droplets from the fluid flow, while leaving water vapor and smaller sized water droplets. The separator therefore does not have a high efficiency for overall water removal. This is acceptable for the fuel cell application, as humidity is required on both the anode and cathode sides for the fuel cell to function correctly. Since the anode stream is mixed with a dry fresh feed of hydrogen prior to stack inlet, there is an opportunity for small droplets to vaporize prior to reaching the stack. Additionally, the stack module can accept a certain amount of liquid water ingestion without loss of cell voltage stability. This amount is typically in the range of 5-30 cc/min. The design of the separator provides a small, compact, easily manufactured device allowing for use in applications such as a fuel cell system in a vehicle where packaging, weight, and cost are on-going concerns. Additionally, the separator structure and assembly is designed to be compatible with hydrogen molecules in a fluid flow, such as downstream of an anode side.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Description of constituents in chemical terms refers to the constituents at the time of addition to any combination specified in the description, and does not necessarily preclude chemical interactions among constituents of the mixture once mixed.

Figure 1:
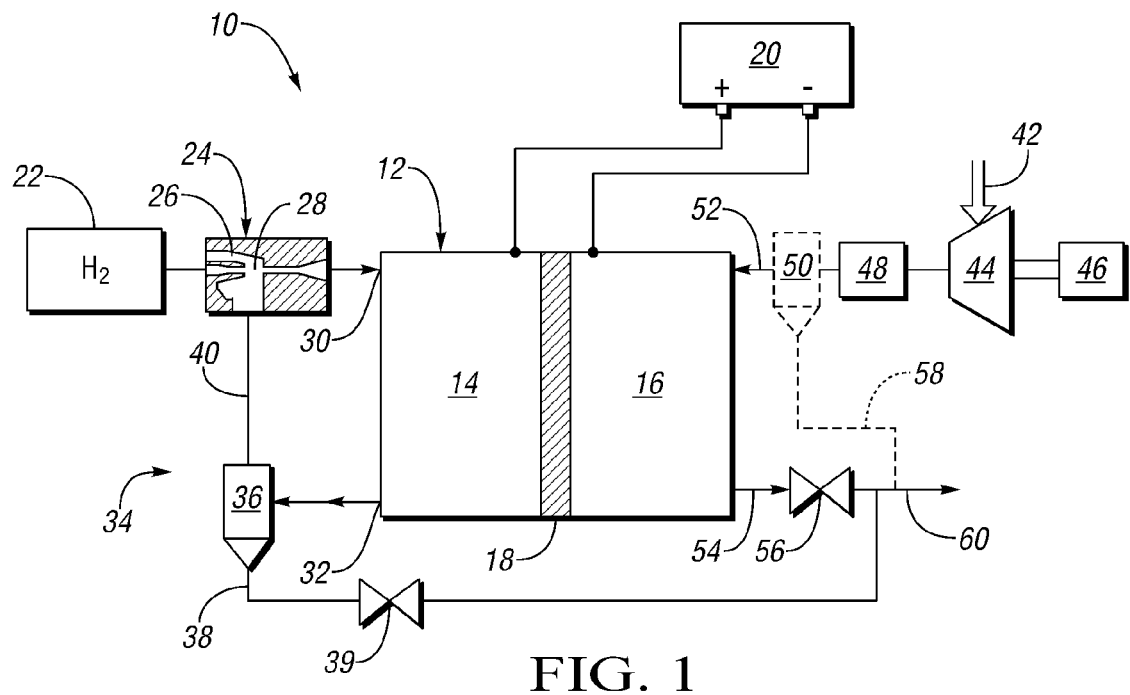
FIG. 1 illustrates a schematic of a fuel cell system according to an embodiment.

FIG. 1 schematically illustrates a fuel cell system 10 as a process flow diagram according to at least one embodiment. For example, fuel cell system 10 may be used in a vehicle to provide electrical power to operate an electric motor to propel the vehicle or perform other vehicle functions. The fuel cell system 10 may be a proton exchange membrane fuel cell (PEMFC) as is known in the art.

The fuel cell 10 has a fuel cell stack 12. The stack 12 contains an anode side 14, a cathode side 16, and a membrane 18 therebetween. The fuel cell 10 electrically communicates with and provides energy, for example, to a high voltage bus 20 or a traction battery. The fuel cell stack 12 may also have a cooling loop (not shown).

During operation of the fuel cell 10, product water, residual fuel such as hydrogen, and byproducts such as nitrogen, may accumulate at the anode side 14 of the fuel cell stack 12. Attempts have been made to remove the liquid product water and byproducts and to reuse the residual hydrogen and water vapor. One approach is to collect those constituents in a separator 36 downstream of the fuel cell stack 12, separate at least a portion of the liquid water and/or nitrogen, and return the remaining constituents to the fuel cell stack 12 via a return passageway in a recirculation loop.

A primary fuel source 22 is connected to the anode side 14 of the fuel cell stack 12, such as a primary hydrogen source. Non-limiting examples of the primary hydrogen source 22 are a high-pressure hydrogen storage tank or a hydride storage device. The hydrogen source 22 is connected to one or more ejectors 24. The ejector 24 has a nozzle 26 supplying hydrogen into the converging section of a converging-diverging nozzle 28. The diverging section of the nozzle 28 is connected to the input 30 of the anode side 14.

The output 32 of the anode side 14 is connected to a passive recirculation loop 34. Typically, an excess of hydrogen gas is provided to the anode side 14 to ensure that there is sufficient hydrogen available to all of the cells in the stack 12. In other words, hydrogen is provided to the fuel cell stack 12 above a stoichiometric ratio of one, i.e. at a fuel rich ratio relative to exact electrochemical needs. The recirculation loop 34 is provided such that excess hydrogen unused by the anode side 14 is returned to the input 30 so may be used and not wasted.

Additionally, accumulated liquid and vapor phase water is an output of the anode side 14. The anode side 14 requires humidification for efficient chemical conversion and to extend membrane life. The recirculation loop 34 may be used to provide water to humidify the hydrogen gas before the input 30 of the anode side 14.

The recirculation loop 34 contains a separator 36, or water knock-out device. The separator 36 receives a stream or fluid mixture of hydrogen gas, nitrogen gas, and water from the output 32 of the anode side 14. The water may be mixed phase and contain both liquid and vapor phase water. The separator 36 removes at least a portion of the liquid phase water, which exits the separator through drain line 38. At least a portion of the nitrogen gas, hydrogen gas, and vapor phase water may also exit the drain line 38, and pass through a control valve 39, for example, during a purge process of the fuel cell stack 12. The remainder of the fluid in the separator 36 exits through passageway 40 in the recirculation loop 34, which is connected to the ejector 24. The fluid in passageway 40 is fed into the converging section of the converging-diverging nozzle 28 where it mixes with incoming hydrogen from the nozzle 26 and hydrogen source 22.

Liquid water may be removed from the anode side 14 by the separator 36 to prevent water blockages within the channels and cells of the anode side 14. Water blockages within the fuel cell stack 12 may lead to decreases in cell voltage and/or voltage instabilities within the fuel cell stack 12. Liquid water may also be removed by the separator 36 to prevent a blockage or partial blockage within the ejector 24. A liquid water droplet in the diverging section of the converging-diverging nozzle 28 would effectively create a second venturi section within the nozzle 28 and lead to pumping instabilities for the ejector 24.

The cathode side 16 of the stack 12 receives oxygen, for example, as a constituent in an air source 42. In one embodiment, a compressor 44 is driven by a motor 46 to pressurize the incoming oxygen. The pressurized air is then humidified by a humidifier 48 before entering the cathode side 16. Another separator 50 (shown in phantom) may be positioned downstream of the humidifier 48. The separator 50 may be used to remove liquid water from the humidified air flow before it enters the cathode side 16 of the stack 12 at input 52. Water droplets may be present downstream of the humidifier 48 due to liquid water being entrained by air high flow rates within the humidifier 48. Liquid water may be removed by the separator 50 to prevent water blockages within the cells of the cathode side 16, leading to decreases in cell voltage and/or instabilities within the fuel cell stack 12. The output 54 of the cathode side 16 is connected to a valve 56. Drain line 38 from separator 36, and a drain line 58 from separator 50 may be connected to a line 60 downstream of the valve 56. In other embodiments, the drain lines may be plumbed to other locations in the fuel cell system 10.

Other system architectures may also be used for the fuel cell system 10. For example, a turbine may be used in addition to the compressor 44 to induce flow through the cathode side 16. In one example, a turbine is positioned downstream of the cathode stack outlet 54, with a separator interposed between the cathode side 16 and the turbine to remove liquid water before the fluid stream enters the turbine.

Based on the use of the ejector 24 to create flow through the anode side 14 and induce flow through the passive recirculation loop 34, the ejector 24 must overcome any pressure drops in the system, which includes a typically significant pressure drop across the fuel cell stack 12. Therefore, the separator 36 needs to have a low pressure drop across it. The separator 36 also needs to remove larger droplets of water from the fluid to prevent water blockages in the recirculating flow in the fuel cell stack 12 or ejector 24 caused by droplets. The separator 36 permits vapor phase water and smaller water droplets to remain in the recirculating flow in passageway 40 and return to the ejector 24 for humidification purposes. In one example, the separator 36 removes water droplets having a diameter on the order of one millimeter or larger droplets less than approximately 15% of the ejector 24 mixing chamber diameter for fuel cell system 10.

Additionally, as separator 36 receives fluid flow from the anode side 14, the separator 36 needs to be designed for use with hydrogen gas. Generally, hydrogen gas may cause material degradation or embrittlement issues and material used in the separator 36 need to be hydrogen compatible. Additionally, hydrogen is a small molecule, and many prior art separator devices are not suitable for use with hydrogen because their design may permit leaks, for example, with a conventional threaded connection. Other conventional, prior art separators may contain rotating or moving parts, such as a rotating vane, or the like, which may not be compatible with hydrogen as the lubricant may poison the fuel cell stack, or the hydrogen may degrade or decompose the lubricant.

Separator 50 also needs to remove larger droplets of water from the fluid to prevent water blockages caused by droplets in the flow in the cathode side 16 of the fuel cell stack 12. The separator 50 permits vapor phase water, and smaller water droplets to remain in the flow for humidification. In one embodiment, the separator 50 removes water droplets that are the same size or larger than the cathode side 16 flow field channel widths. In one example, the cathode side flow field channels are 0.2-1.0 millimeters.

FIGS. 2-5 illustrate an embodiment of a separator 100. The separator 100 may be used as separator 36 or as separator 50 for the fuel cell system 10 illustrated in FIG. 1. Separator 100 has a first upper portion 102 and a second lower portion 104. The first and second portions 102, 104 define a chamber 106. A divider 108 is positioned between the first and second portions 102, 104. The divider 108 divides the chamber 106 into an upper vortex chamber 110 and a lower collection chamber 112. The divider 108 has an edge gasket 114 and a screen 116. The screen 116 may be a larger mesh size and made of a material having a low contact angle to prevent liquid from sheeting on the screen 116, and allow the liquid to drip down into the collection chamber 112. In one embodiment, the contact angle of the screen 116 is less than ninety degrees, and in a further embodiment is less than fifty degrees. In another embodiment, the separator 100 does not contain a divider 108 and only has a single chamber 106 that acts to both separate and collect liquid water.

The first portion 102 has a generally cylindrical side wall 118 and an end wall 120. In other embodiments, the side wall 118 may be tapered into a frustoconical shape or another suitable shape. A protrusion or projection 122 extends into the chamber 106 from the end wall 120. The protrusion 122 has a generally cylindrical section 124 with a convex end cap 126. The convex end 126 may be hemispherical or another rounded or convex shape. In an alternative embodiment, the end cap 126 is planar. In another embodiment the end cap 126 is omitted and the protrusion 122 may be hollow and open to the chamber 106. The protrusion 122 is nested with the side wall 118 of the first portion 102 to form a channel therewith.

The first portion 102 has an inlet conduit 128 and an outlet conduit 130. The inlet conduit 128 is tangentially connected to the side wall 118 such that fluid flowing through the inlet conduit 128 enters the chamber 106 to flow smoothly along the side wall 118 without any turns imposed by the geometry of the connection between the inlet conduit 128 and the first portion 102. At the entrance point 131 where the fluid enters the chamber 110 from the inlet conduit 128, the fluid is flowing generally parallel with the side wall 118. The inlet conduit 128 is positioned at a higher elevation than the end cap 126 and end of the protrusion 122. The fluid therefore enters the chamber 106 above the end region 126 of the cylinder 122 to induce and retain swirl and prevent the fluid flow from shortcutting across the chamber 106.

Figure 3:
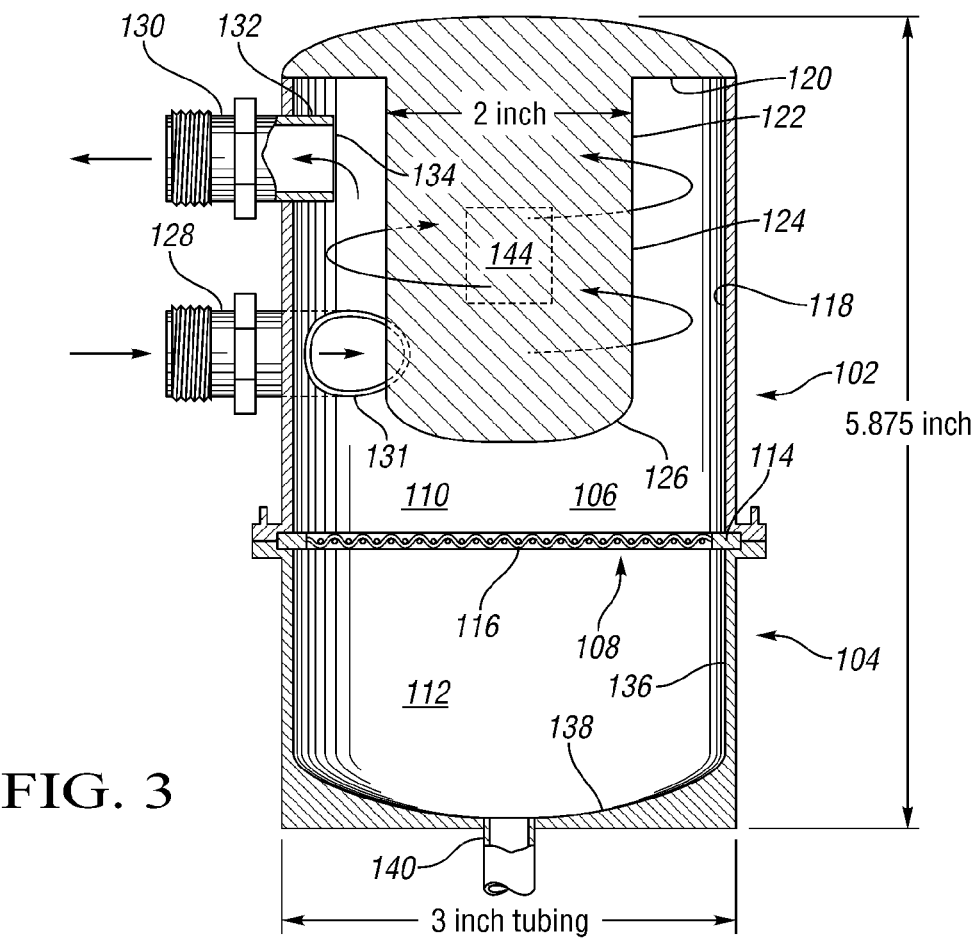
FIG. 3 illustrates a sectional view of the water separator of FIG. 2.

For a vehicle or fuel cell application, the inlet and outlet conduits 128, 130 do not need to be positioned along a common axis, or in-line with one another, as is shown for many conventional, prior art separators, thereby allowing for improved packaging of the separator 100 into available space. Overall dimensions of the separator 100 are illustrated in FIG. 3 according to one non-limiting example. The separator 100 may be constructed such that the ratio of the inlet conduit 128 diameter to the overall diameter of the chamber 106 may lie within the range of 1:2 and 1:8, and is illustrated as 1:6 in FIG. 3. The inlet conduit 128 diameter and outlet conduit 130 diameter may be equal, or may vary. In one embodiment, the inlet 128 diameter is 14 mm and the outlet 130 diameter is 12 mm.

The outlet conduit 130 is connected to the first portion 102 such that it extends generally perpendicularly from the side wall 118 where it is attached. In other embodiments, the connection angle between the outlet conduit 130 and the side wall 118 may vary. The outlet conduit 130 is interposed between the inlet conduit 128 and the end wall 120 of the first portion 102 such that it is at a higher elevation than the inlet conduit 128. The outlet conduit 130 has a section of tubing 132 that extends into the chamber 106 as shown such that an entrance 134 to the outlet conduit 130 from the chamber 106 is spaced apart from the side wall 118.

The second portion 104 has a generally cylindrical side wall 136 and an end wall 138. In other embodiments, the side wall 136 may be tapered into a frustoconical shape, generally conical shape, or other suitable shape. The side wall 136 of the second portion 104 is sized such that the second portion 104 mates with gasket 114 of the divider 108 and with the first portion 102. The end wall 138 may be concave or bowl shaped. In an alternative embodiment, the end wall 138 is planar. The second portion 104 may be sized to only collect a small amount of liquid water. The collection chamber 112 of the second portion 104 may be reduced in volume until the point where circulating fluid in the vortex chamber 110 causes splashback of liquid from the collection chamber 112 to the vortex chamber 110 through the screen 116.

The second portion 104 has a drain conduit 140. The drain conduit 140 is positioned at the lowest point of the end wall 138, and is typically positioned in the center or a central region of the end wall 138, or along the longitudinal axis of the separator 100. By positioning the drain 140 at the lowest point of the chamber 112, any liquid within the chamber 112 may be easily removed, for example, if the vehicle or fuel cell is in a low ambient temperature environment where freezing is possible.

The drain conduit 140 may be sized such that liquid water cannot bridge or sheet across the opening. The drain conduit 140 may also be made from a low contact angle material to prevent liquid sheeting across the opening. In one embodiment, the drain conduit 140 is made from stainless steel, and for the separator shown in FIG. 3, has a diameter of approximately 6 mm. In another embodiment, the drain conduit 140 is made from hydrophobic fluoropolymer such as polytetrafluoroethylene, and for the embodiment shown in FIG. 3, has a contact angle of approximately ninety degrees or more and a diameter of 10 mm. Of course, other materials, and other sizing may be used with the separator 100 to meet system requirements.

The first portion 102, second portion 104, and divider 108 are connected to one another using a band clamp 142 or other fastening device suitable for use with hydrogen as is known in the art.

Although the separator 100 is described as having first and second portions with an interposed divider, the separator may also be constructed in another manner according to various embodiments of the disclosure. For example, the two portions may be integrally formed and do not need to be separable. The portions may be welded or otherwise joined together.

In some embodiments, a thermal sink 144 is positioned within the protrusion 122. In one example, the thermal sink 144 is a fin heat exchanger or another heat exchanger. In another example, the thermal sink 144 is a thermoelectric device such as a Peltier cooler. The thermal sink 144 may be controlled to cool the protrusion 122 and create a relatively cold spot in the separator 100 and within the anode side loop of the fuel cell. During soak of the fuel cell, for example, at fuel cell startup or prior to startup, the thermal sink 144 may be activated to condense water vapor from the fluid flow in order to remove additional water from the fuel cell.

Additionally, excess nitrogen may be removed from the anode side 14 of the fuel cell during a purge process. When the concentration or partial pressure of nitrogen in the anode side 14 of the fuel cell is too high, the performance of the fuel cell 10 decreases as there is an insufficient concentration of hydrogen, or the partial pressure of hydrogen is too low. By purging the anode side 14 of the fuel cell, the excess nitrogen is flushed out of the anode side 14 of the stack 12. The mixture of hydrogen, excess nitrogen, and liquid and vapor phase water enters the separator 100 during the purge process. The separator 100 causes liquid water, excess nitrogen, and a portion of the hydrogen to exit the drain line 140 of the separator. Some hydrogen and other constituents in the flow may be returned through the outlet conduit 130 of the separator to the ejector 24. The ejector 24 also may not perform well in the presence of high concentrations of nitrogen, as the density of nitrogen is higher than that of hydrogen. Therefore, by removing excess nitrogen from the anode side 14 of the fuel cell during a purge process, overall fuel cell performance may be increased.

Figure 4:
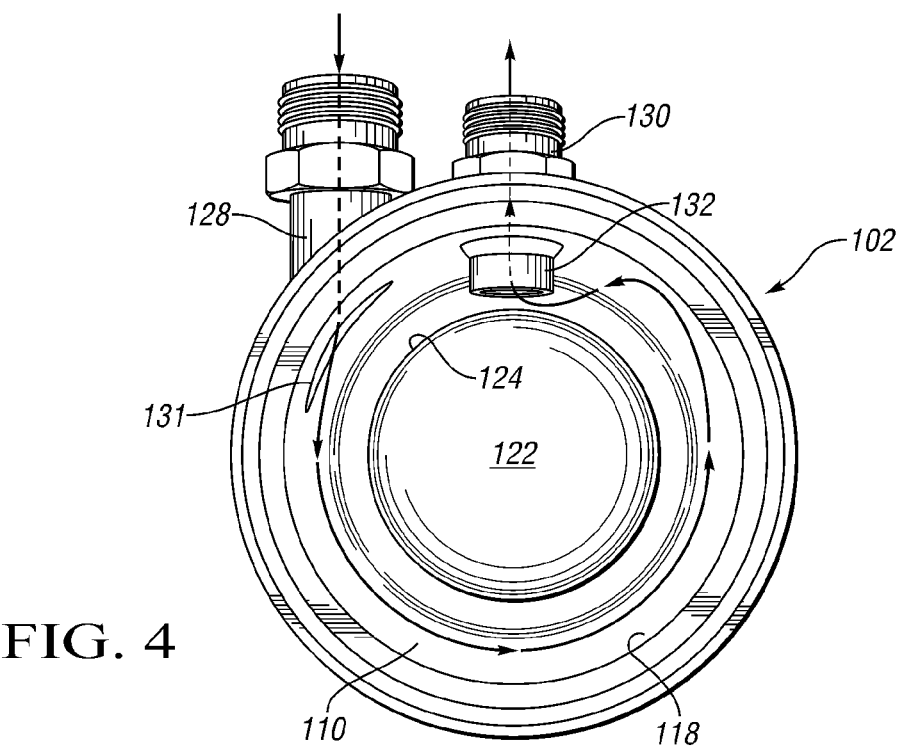
FIG. 4 illustrates another sectional view of the water separator of FIG. 2.
Figure 5:
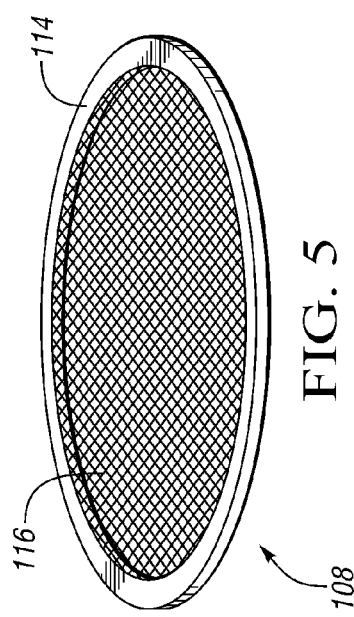
FIG. 5 illustrates a divider for use with the separator of FIG. 2.

Operation of the separator 100 is further described with reference to FIGS. 3 and 4. The fluid stream from the anode 14 enters the separator 100 though the inlet conduit 128, and contains hydrogen gas, nitrogen gas, water vapor, and liquid water. The fluid enters the chamber 110 generally parallel or tangential to a side wall 118, which reduces the overall pressure drop across the separator. The side wall 118 of the chamber 110 and the side wall 124 or the protrusion 122 act to guide the fluid in the chamber 110 in a channel that forms between them. The fluid is spun in the chamber 110, as shown by arrows, to remove liquid entrained in the fluid stream. Centripetal acceleration created by the rotational fluid flow and liquid droplets causes them to move to the wall 118. The droplets impact the wall 118 and then gravity causes the liquid to run down the wall 118 and into the collection chamber 112. The remaining fluid, which includes hydrogen gas, nitrogen gas, water vapor, and smaller water droplets continue to spin within the separator 100. The smaller water droplets continue to spin or rotate with the fluid flow as their mass is insufficient for the centrifugal forces acting on them to cause them to move to and impact the wall 118.

The fluid stream is then forced to separate away from the wall 118 in order to exit the separator 100 through the outlet conduit 130. The fluid must turn in order to exit the chamber 110, which provides for additional separation of entrained water droplets from the fluid stream. The entrance 134 to the outlet conduit 130 is offset from the wall 118 towards the center of the separator using extension 132, and the fluid is forced to make a sharp turn, as shown by the arrows in FIG. 4. Liquid droplets above a certain size are separated from the fluid flow as they cannot follow the turn due to their momentum, and these droplets eventually make their way to the collection chamber 112 as well. The fluid flow has a generally unobstructed, uninterrupted flow path between the inlet conduit 128 and the outlet conduit 130, which decreases the pressure drop across the separator 100.

The outlet conduit 130 may also be located at a higher elevation than the inlet conduit 128. The lighter gas and vapor can move upward and make the abrupt turn to exit the separator 100 through outlet conduit 130, thereby, separating the liquid water from the gas. Gravity is used to direct the heavier liquid droplets down to the bottom of the separator 100 as the fluid spins around in the separator 100 while the lighter gases, vapor, and smaller droplets easily rise up to the outlet 130.

The screen 116 of the divider 108 creates a location for condensation to occur and also provides a flow-smoothing effect for fluid rotating in the vortex chamber 110. The screen 116 also acts to maintain a relatively calm environment within the collection chamber 112, and prevent fluid motion such as splashback into the upper chamber 110. The collection chamber 112 beneath the screen 116 collects liquid water and directs it to the drain conduit 140.

Figure 2:
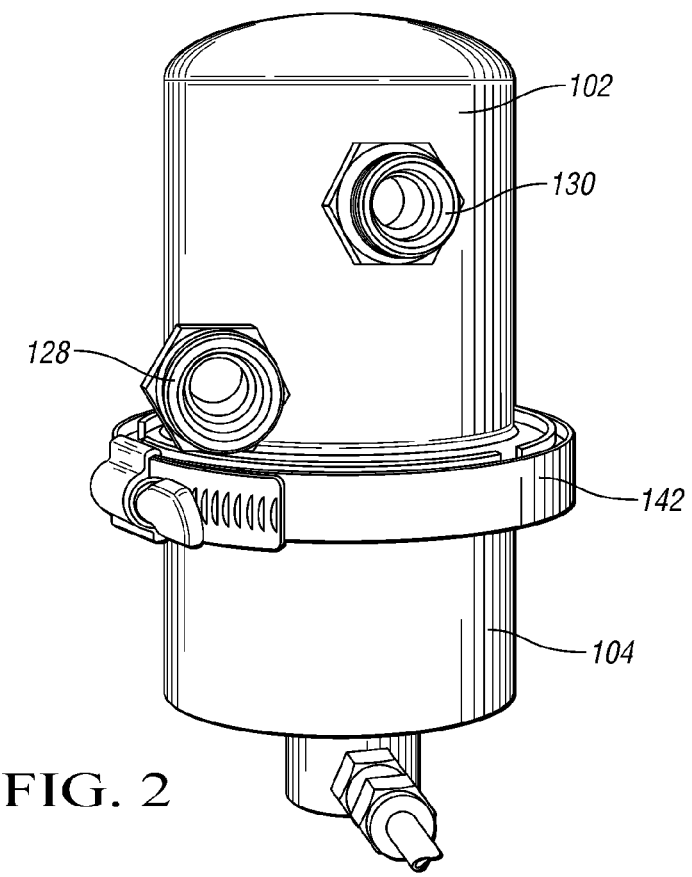
FIG. 2 illustrates a perspective view of a water separator according to an embodiment for use with the fuel cell of FIG. 1.
Figure 6:
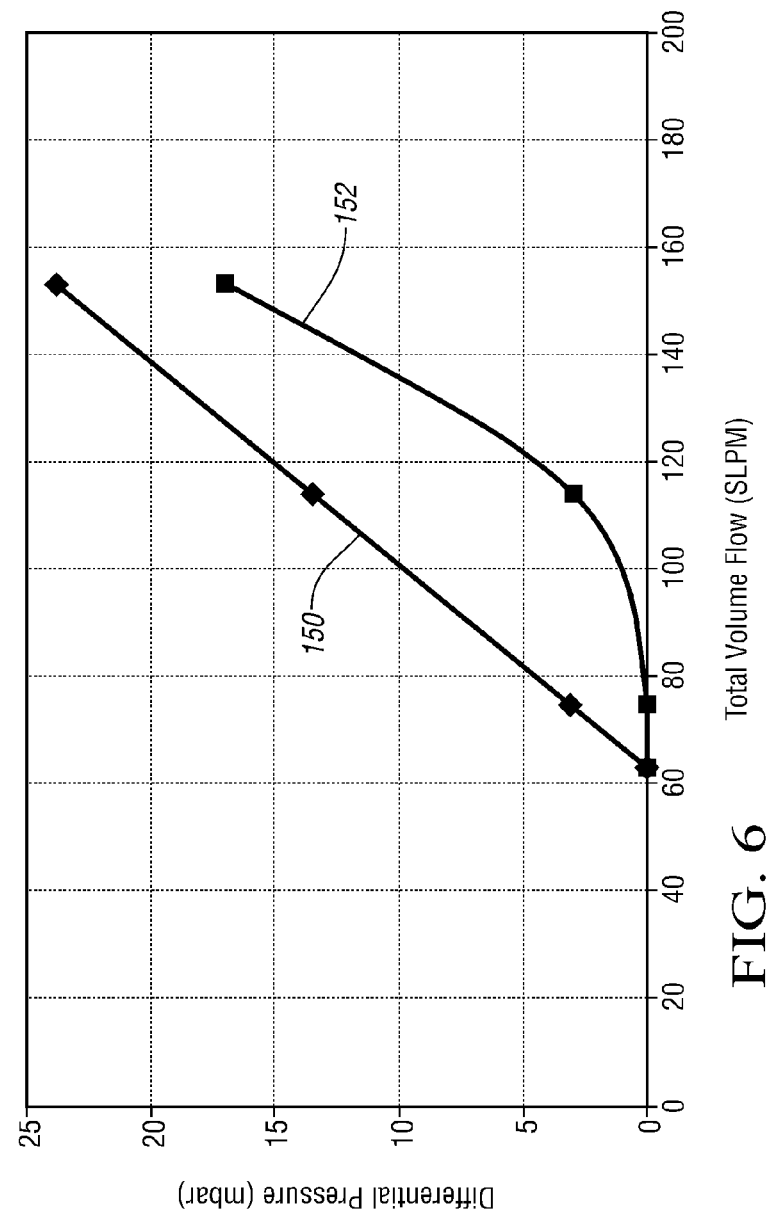
FIG. 6 illustrates a graph comparing pressure drops across a conventional, prior art separator and the separator of FIG. 2 at various volumetric flow rates.

FIG. 6 illustrates a pressure difference, or pressure drop, for an industrial centrifugal, prior art separator and the separator according to FIG. 2 at various volumetric flow rates. The pressure drop is shown in millibars. The volumetric flow rate is shown in standard liters per minute. The prior art separator is the same package size as the separator of FIG. 2. The prior art separator is a conventional type having in-line inlet and outlet conduits and a centrifugal chamber located generally below the conduits. The prior art separator has the fluid flow making sharp turns to both enter and exit the separator. The pressure drop across the prior art separator is shown by line 150. The pressure drop across the separator of FIG. 2 is shown by line 152. As can be seen in FIG. 6, the pressure drop across the separator according to the present disclosure is much lower than the prior art across all flow rates tested.

Various embodiments of the present disclosure have associated non-limiting advantages. For example, providing a separator with a low pressure drop allows for use with a passive recirculation loop in an anode side of a fuel cell. The low pressure drop is created within the separator by providing a smooth tangential fluid entry into the separator, and not using additional mesh material in the gas phase fluid flow path within the separator. The separator is designed to remove larger water droplets from the fluid flow, while leaving water vapor and smaller sized water droplets. The separator therefore does not have a high efficiency for overall water removal. This is acceptable for the fuel cell application, as humidity is required on both the anode and cathode sides for the fuel cell to function correctly. Since the anode stream is mixed with a dry fresh feed of hydrogen prior to stack inlet, there is an opportunity for small droplets to vaporize prior to reaching the stack. Additionally, the stack module can accept a certain amount of liquid water ingestion without loss of cell voltage stability. This amount is typically in the range of 5-30 cc/min. The design of the separator provides a small, compact, easily manufactured device allowing for use in applications such as a fuel cell system in a vehicle where packaging, weight, and cost are on-going concerns. Additionally, the separator structure and assembly is designed to be compatible with hydrogen molecules in a fluid flow, such as downstream of an anode side.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell system comprising:
a fuel cell stack; and
a separator in fluid communication with the fuel cell stack, and having:
first and second end walls connected by a side wall thereby forming a separation chamber, the first end wall forming a protrusion extending into the chamber to form a channel with the side wall, the protrusion formed by a cylindrical section and an end cap, a first end of the cylindrical section connected to the first end wall, the end cap extending across and covering a second free end of the cylindrical section, an inlet conduit tangentially connected to the side wall, a gas and vapor outlet conduit connected to the side wall between the inlet conduit and the first end wall, and a liquid drain connected to the second end wall.

2. The fuel cell system of claim 1 wherein the fuel cell stack has an anode side and a cathode side;

the fuel cell system further comprising a recirculation loop in fluid communication with the anode side;

wherein the recirculation loop includes the separator, the separator downstream of the anode side.

3. The fuel cell system of claim 2 further comprising an ejector in fluid communication with the anode side and upstream of the anode side.

4. The fuel cell system of claim 3 wherein the ejector is in fluid communication with the recirculation loop, wherein the ejector is downstream of the separator.

5. The fuel cell system of claim 1 wherein the fuel cell stack has an anode side and a cathode side;

the fuel cell system further comprising a humidifier in fluid communication with the cathode side and upstream of the cathode side;

wherein the separator is interposed between the humidifier and the cathode side.

6. The fuel cell system of claim 1 further comprising a thermal sink supported within the protrusion.

7. The fuel cell system of claim 1 wherein the outlet conduit is connected generally perpendicular to the side wall, the outlet conduit extending into the channel such that an entrance to the outlet conduit is spaced apart from side wall and is spaced apart from the protrusion.

8. The fuel cell system of claim 1 wherein the outlet conduit extends into the chamber such that an entrance to the outlet conduit is positioned in the channel between the inlet conduit and the first end wall.

9. A separator for a fuel cell comprising:

first and second ends connected by a side wall to define a separation chamber, the first end having a protrusion extending into the chamber to form a channel with the wall, the protrusion having a generally cylindrical portion and a convex end cap portion extending across and covering the cylindrical portion;

an inlet conduit tangentially connected to the wall;

a gas and vapor outlet conduit connected to the wall between the inlet conduit and the first end; and a liquid drain connected to the second end.

10. The separator of claim 9 wherein the outlet conduit is connected generally perpendicular to the side wall to extend radially outwardly therefrom.

11. The separator of claim 9 wherein the outlet conduit extends into the channel of the chamber such that an entrance to the outlet conduit is spaced apart from the wall and is positioned between the inlet conduit and the first end.

12. The separator of claim 9 wherein the inlet conduit is positioned on the side wall between the first end and an end of the protrusion such that incoming fluid enters the channel of the chamber.

13. The separator of claim 9 wherein the second end is concave.

14. The separator of claim 9 further comprising a screen positioned between the inlet conduit and the second end.

15. The separator of claim 14 wherein an end of the protrusion is spaced apart from the screen.

16. The separator of claim 9 further comprising a thermal sink supported within the protrusion.

17. The separator of claim 16 wherein the thermal sink is a thermoelectric cooling device.

18. The separator of claim 9 wherein the ratio of a diameter of the inlet conduit to a diameter of the chamber is between 1:2 and 1:8.

19. A fuel cell separator comprising:

first and second ends connected by a side wall to define a separation chamber, the first end having a cylindrical protrusion covered by a convex end cap extending into the chamber to form a channel with the wall;

a gas and vapor outlet conduit connected to the wall between the first end and an inlet conduit tangentially connected to the wall; and a liquid drain connected to the second end.

* * * * *